May 17, 1960          H. A. QUIST          2,936,623
LIQUID LEVEL ELECTRICAL INDICATOR
Filed Oct. 1, 1956          3 Sheets-Sheet 1
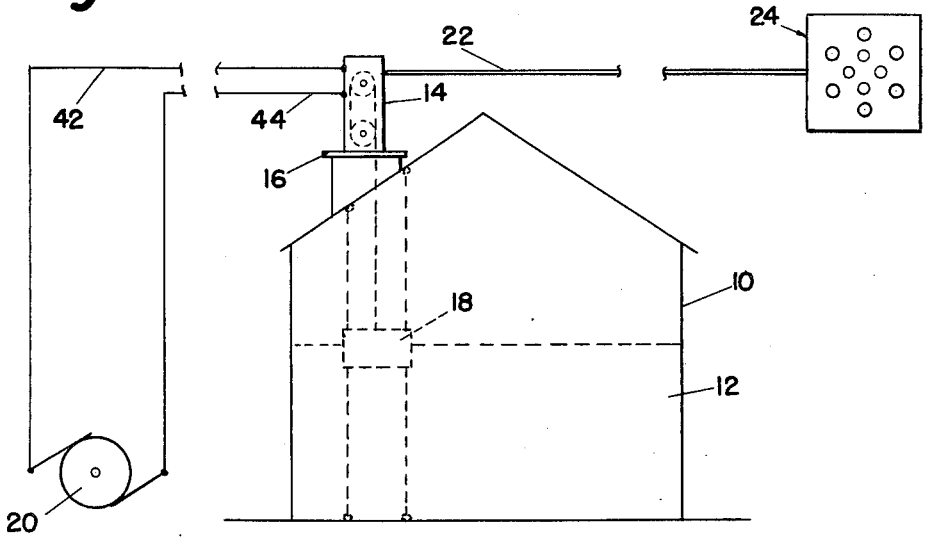
Fig. 1
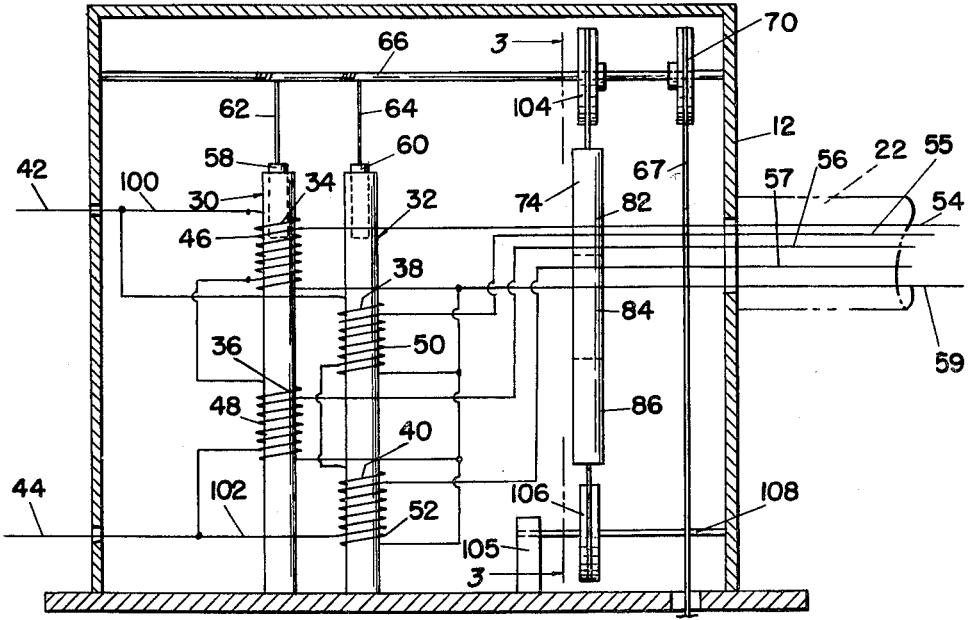
Fig. 2
INVENTOR.
HAROLD A. QUIST
ATTORNEY

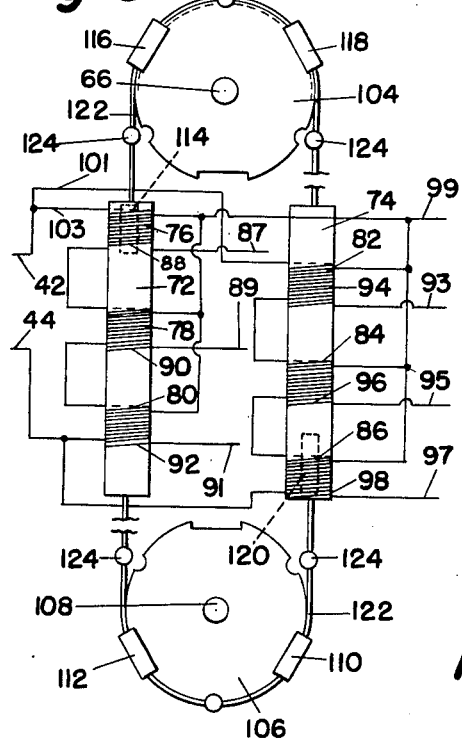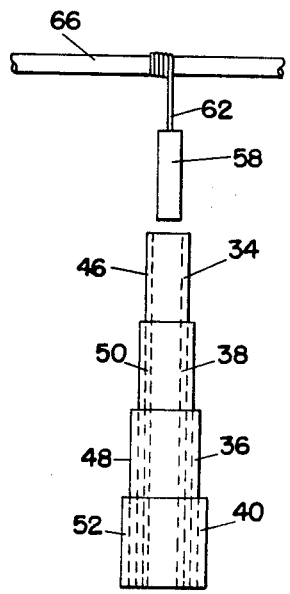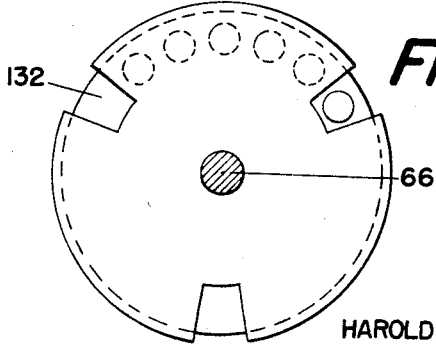

May 17, 1960        H. A. QUIST        2,936,623
LIQUID LEVEL ELECTRICAL INDICATOR
Filed Oct. 1, 1956        3 Sheets-Sheet 3

*Fig. 8*

*INVENTOR.*
HAROLD A. QUIST

BY Robert O. Spindle

ATTORNEY

United States Patent Office 2,936,623
Patented May 17, 1960

2,936,623
LIQUID LEVEL ELECTRICAL INDICATOR

Harold A. Quist, Swarthmore, Pa., assignor to Sun Oil Company, Philadelphia, Pa., a corporation of New Jersey Application October 1, 1956, Serial No. 613,100

4 Claims. (Cl. 73—313)

This invention relates to improvements in apparatus for indicating by electrical means, fluctuations in the level of large stored liquid bodies such as are found in the petroleum and chemical industries.

The control and measurement of electric currents transmitted by inductance means is well known in the electrical art. In some instances this method of detecting liquid level changes has been used where the depth of the liquid was limited to a few feet and where the float element was either a magnetic or partly magnetic element, or directly supported such an element and was used in direct cooperation with primary and secondary electrical coils to affect the induced field existing between them. In large tanks such as are employed in the storage of petroleum products, approximating a depth of fifty feet or more, the combination of a float influencing magnetic field in direct combination with induction coils requires extensive construction and is impracticable. It is therefore the primary object of this invention to provide an improved device operating on the inductance principle to convey measured movement caused by changes in liquid level elevations to indicating or recording means remote from the storage area.

A further object is to provide a liquid level responsive device which will electrically detect all vertical movement of the liquid surface with great accuracy, regardless of the extent of the variations in depth of the liquid volume.

And yet another object is to provide an electrically responsive device of this nature which is low in cost and easy to install and maintain.

In accordance with the present invention, these, and other objects appearing as the description proceeds, are attained by using two coordinated and related measuring devices, both operated electrically on the induction principle, both devices being combined to respond to a single liquid level sensing element. By proportioning the responsive movements between the two devices, one device indicates a unitary measure, such as feet, while the other device shows subdivisions of the unitary measure such as inches and fractions of an inch. The arrangement of the responsive devices is such as to make the complete mechanism compact and adapted for easy mounting on any storage vessel. Further, this liquid level responsive device readily lends itself to multiple use whereby many storage vessels can be attended by separate responsive mechanisms served from a single power source and measured by a common indicating device.

For a full understanding of the invention, outlined above, a detailed description of operating forms is now given in connection with the accompanying drawing forming a part of this specification, in which:

Fig. 1 is an elevational view of the invention supported in a housing adjacent the body of liquid to be measured;

Fig. 2 is an elevational view partly in section of one form of the liquid level responsive device.

Fig. 3 is a sectional view of the device shown in Fig. 2, taken on line 3—3.

Fig. 4 is an elevational view, partly in section, showing an alternate form of mechanism.

Fig. 5 is a perspective view of a sub-combination in detail of the operating elements in Fig. 4.

Fig. 6 is a view of the unitary measuring element of Figs. 2 and 4 in modified form.

Fig. 7 is a view of the sub-combination measuring fractions of the unit measurement of Fig. 5 in a modified form.

Fig. 8 is a diagram of one form of electrical circuit which will cooperate with the liquid level responsive device and the indicating elements normally used with this mechanism.

Referring now to the figures of the drawing where similar parts are designated by identical reference characters, numeral 10 designates a storage tank generally shown here as a fixed roof type with stored liquid 12 therein. It is not intended to confine this mechanism to storage vessels of this type solely, as it will be evident later that the device is easily adapted, without inventive process, to floating roof tanks or other modifications generally used in the storage of liquids. A housing 14 mounted on manhead 16 diagrammatically indicates the position of the liquid level responsive mechanism of this invention. A float 18 is indicated, symbolically, directly beneath the responsive mechanism housing 14 and is intended to indicate one form of liquid level sensing device which may be used with the responsive device. A source of power is symbolized as numeral 20 connected to the housing 14 as by conductors 42 and 44, supplying the necessary electrical current for the responsive mechanism later to be described. Additionally, a conduit 22 is shown leading away from the housing 14 to carry the necessary electrical connections for use with standard meters diagrammatically arranged in a remotely located assembly 24.

The responsive mechanism supported in housing 14 as shown in Fig. 1 is illustrated here in two forms with suggested modifications. Figs. 2 and 3 of the drawing illustrate one form, while a second arrangement is shown in Figs. 4 and 5. Modified forms of these devices, as later described, and still other forms that the devices can take will suggest themselves to those versed in the art. These two forms, however, are used to illustrate the combination of the several elements within a supporting housing, both arrangements being equally satisfactory for attaining the objects of the invention and both using the same principles with equal results.

Figs. 2 and 3 illustrating one arrangement of the induction elements as combined with the liquid level sensing means forming the responsive mechanism will be described first. The purpose of both forms and the suggested modifications shown here is to arrange the electrically responsive induction elements for the purpose of transmitting a unitary measurement such as feet and subdivisions of this unit such as inches and fractions of an inch. Forms of these two separate sub-combinations are united to cooperate through an element common to both to obtain accurate correlation. Both of these unit and sub-unit measuring assemblies are in turn adapted to cooperate with the liquid level sensing means also operable through a common element in order to obtain a coordinated and exact response.

The portion of the mechanism for measuring the large, or approximate, unit such as feet is shown as a plurality of vertically arranged induction coils, shown here as two groups numbered 30 and 32, which are arranged cylindrically as a plurality of primary and secondary coils forming separate induction means and limited to apportioned sensitive parts of the groups 30 and 32 as indicated by segments for each coil pair. Primary coils 34 and 36 of group 30 are spaced to electrically offset the vertical spacing of the primary coils 38 and 40 of group 32. Such an arrangement facilitates separate meter indications over the full range of the storage tank depth. The primary coils 34 and 36 are connected in series across conductors 42 and 44, as likewise are coils 38 and 40, for supply of operating electrical current. Secondary coils 46, 48, 50, and 52 are inductively coupled to the primary coils 34, 36, 38, and 40, respectively, as shown. These secondary coils are shown connected separately as by conductors 54, 55, 56 and 57, together with the common or ground wire 59, all of which pass through the housing 12 into conduit 22 for connection with separate meters on the meter panel 24, as will be illustrated and described later in relation to Figure 8. Also as will be understood later in describing Figure 6, other arrangements of the induction coils may be adopted making the device even more compact and requiring only one meter for this measurement instead of four as presently indicated. Magnetic slugs indicated by the numerals 58 and 60 are suspended by cables 62 and 64 wound on shaft 66 and are raised and lowered within the cylindrical fields of the electrical coil pairs as shaft 66 is rotated by the movement of the liquid level sensing element shown here as float 18. It will be recognized that any vertical movement of the liquid 12 as caused by a change in volume will in turn raise or lower float 18, transmitting a rotating movement to shaft 66 through cable 67 and drum 70. The magnetic slugs 58 and 60 suspended from shaft 66 by cables 62 and 64 are arranged to oppose the direction of winding of cable 67 on drum 70 thereby acting as a tensioning device for the liquid level sensing float 18 as well as an electrical element and thus steadying the rotative operating movement of the responsive mechanism.

Fig. 3 illustrates the sub-division indicating portion of this form of the responsive device as two vertically arranged cylindrical tubes 72 and 74 on which a plurality of primary and secondary coil pairs are arranged in staggered spaced relation with each other. Six sets of primary and secondary coils grouped as pairs are used here, three on each of the two cylindrical tubes 72 and 74. The tubes 72 and 74, as well as the tubes 30 and 32, are made of a suitable non-metallic and electrically insulating material. The three series-connected primary coils 76, 78 and 80 on cylindrical tube 72 are connected in parallel with the series-connected primary coils 82, 84 and 86 on tube 74, each set of three coils being connected across the power source 20. Secondary coils 88, 90, 92, 94, 96, 98 are inductively associated with these primary coils 76 to 86, respectively, forming pairs as noted. These six pairs of coils are arranged in staggered vertical relation to each other on their respective tubes 72 and 74, thereby dividing the vertical distance representing one complete revolution of shaft 66 into six equally spaced apart electrically excited fields. The primary coils 34, 36, 38, and 40 are connected to the source of electrical current as by conductors 100 and 102 connected in turn to the previously described power conductors 42 and 44. Each of the secondary coils 88 to 98, inclusive, are connected as by separate conductors 87, 89, 91, 93, 95 and 97, with common or ground wire 99 to a plurality of separate meters similar to the previously described unitary measurement arrangement, thereby indicating separate electrical effects.

A pair of spaced-apart wheels 104 and 106 are mounted respectively on shaft 66, previously described, and shaft 108 positioned by the housing 12 on one end and by the bearing 105 on the other. Both wheels, rotatable with the shafts which position them, are placed proximate cylindrical tubes 72 and 74 as shown in Figure 3. A plurality of magnetic slugs 110, 112, 114, 116, 118 and 120 are connected as by cable 122 to form an endless loop adapted to engage the periphery of wheels 104 and 106. A number of non-magnetic spaced balls or lugs indicated by the number 124 are fixed on cable 122 and are adapted, together with the magnetic slugs 110, etc., to fit into peripheral notches properly spaced, whereby the cable-connected magnetic slugs are maintained in a relatively fixed spaced relation relative to the six pairs of induction coils mounted on tubes 72 and 74.

As previously described in connection with Figure 3, the primary and secondary coil pairs are arranged in staggered spaced relation with each other. Also, as will be hereinafter described in connection with Figure 8, each of the six secondary coils is connected to a separate electrical meter, and only those meters of the inch measuring group which are actually measuring the field variations will be affected; all others will read zero. For convenience and ease of illustration, the slugs 114 and 120 are shown in Figure 3 as being simultaneously within the fields of the respective secondaries 88 and 98, and the spacing between adjacent slugs such as 114 and 116 is shown as less than it actually is. Note that in Figure 3 the cable 122 is broken to indicate that the illustration has been compressed because of space limitations. Actually, when slug 120 is within the field of secondary 98, slug 114 would be in the space between the secondaries 90 and 88. Further, from the facts that the electrical meters operate separately and that the coil pairs are arranged in staggered spaced relation with each other, it necessarily follows that the spacing between adjacent slugs such as 114 and 116 is actually substantially equal to the overall extent of the secondary coils. To clarify this, an example of operation will be given, this example corresponding to the details given hereinafter in connection with Figure 8. With the wheels 104 and 106 moving clockwise in Figure 3, for a first two-inch interval a slug will be within the field of secondary coil 94; for the second two-inch interval a slug will be within the field of coil 92, for the third similar interval, a slug will be within the field of coil 96, for the fourth similar interval, coil 90 will be active; for the fifth interval, coil 98; and for the sixth interval, coil 88.

Before describing further the electrical metering system used with this form of the responsive mechanism and the operation of the device, an alternate form illustrated in Figures 4 and 5 will be described. This appears to be a logical presentation, as the electrical system is the same for both, and the operating principles and results are alike.

A comparison of Figure 4 with the above-described Figure 2 will show the same unitary indicating elements, cylindrical groups 30 and 32 with the same associated coil pairs of primary and secondary and magnetic slugs 58 and 60, performing the same functions. For simplicity, only the coil forms 30 and 32 are shown in Figure 4, but it is pointed out that these forms have coils mounted and arranged thereon, in exactly the same manner as shown in Figure 2. However, instead of the vertically arranged coils (such as those mounted on tubes 72 and 74, previously described in connection with Figure 3) for the elements measuring the sub-divisions of this unit indicating sub-combination, a plurality of coils are arranged in circular position. For purposes of limiting the extent of the electrical field created by the primary coils and to direct that field toward the responsive secondary coil in this circular form of the device, the coils of these circular groups are preferably of torodial shape. The shaft 66 similarly positioned and operably like the shaft of the same number in Fig. 2, in this instance is concentric to a plurality of primary coils 76, 78, 80, 82, 84 and 86, circumferentially mounted on a non-magnetic disc 130 (see Figure 5). The primary and secondary coils are numbered here the same as previously for the originally described structure. Disc 130, and the mounted primary coils 76, 78, 80, 82, 84 and 86, remain fixed relative to the rotary movement of shaft 66. The source of interrupted electrical current 20 is fed to the primary coils through conductors 42, 44, 101 and 103 as explained in the description of Figure 3. Opposed to the primary coils an equal number of secondary coils 88, 90, 92, 94, 96 and 98 are mounted on a non-magnetic disc 132 also held stationary relative to the rotary movement of shaft 66. The primary coils and secondary coils are arranged to be substantially opposite each other to achieve a true induction through the magnetic field existing between them when exposed to each other.

The magnetic field initiated on exposure by the spaced-apart primary coils mounted as shown on non-magnetic disc 130 to induce an electrical response in the secondary coils mounted oppositely on disc 132 is interrupted by movement of a magnetic disc 136 fastened to rotate with shaft 66 between these spaced-apart primary and secondary coils. An aperture indicated as 138 is cut in the magnetic disc 136, of a size and shape to permit the effect of the magnetic field generated by the primary coil to be transmitted with full induction power to the secondary coil opposite at only one position of rotation of the interfering disc 136. Movement toward or away from this position of full induction power will proportionately alter the electrical effect of the field. It will be readily understood that by such an arrangement the induced electrical field in the secondary coils, transmitted by the separate conductors 87, 89, 91, 93, 95, 97 and common or ground wire 99 to a plurality of separate meters, later shown in Fig. 8, is a measure of the rotary position of shaft 66. Additional pairs of opposed primary coils and secondary coils with intervening magnetic properly apertured discs, and placed in staggered relation with like discs on shaft 66, can be used as additional means for further and more accurate measurements in cooperation with the same revolving shaft. It will be evident that several apertures such as 138 in the magnetic disc 136 can be positioned on one disc to effect other arrangements of magnetic fields, with the cooperating elements thus affording the measurement of an infinite numbers of positions of shaft 66. One modification of this type will be described later as Figure 7.

At this point, by way of a partial summary of the descriptions of the two forms of the invention shown here, and also as a means of emphasizing their respective advantages, a brief comparison will be made. In both responsive devices, it is evident that there must be close cooperation between the movement of the liquid level sensing means and the approximate or unitary measuring (feet) elements. Where a float is used to sense the liquid level, the magnetic slugs 58 and 60 must cooperate with the vertically arranged coils on tubes 30 and 32 to properly indicate the float position at the feet mark. Consequently, drum 70, on which the float supporting cable 67 is wound, bears a linear relationship in measurement to the winding surface (shaft 66) for cables 62 and 64 which positionally support the magnetic slugs. Of course, the larger drum 70 is made, the more sensitive will be the apparatus, because the effective lever arm of the float is thereby increased. As noted, this relationship is effective in both forms of the device shown, for both use the same "foot" measuring element. Although the slugs 58 and 60 are shown at slightly different levels in Figure 4, these should actually be at the same level, as in Figure 2.

However, the two described combinations of elements used to measure sub-divisions of the unitary measurements (inches as sub-divisions of feet) involve different considerations. Generally, both systems must be coordinated with the above discussed float-unitary measurement combination to be of any value. In the first-described device, Figures 2 and 3, the vertically staggered coils mounted on tubes 72 and 74, influenced by magnetic slugs 110, 112, 114, 116, 118 and 120, must be positioned to indicate the inch sub-divisions during each complete revolution of shaft 66 and the attached wheel 104. This requires a diametrical relationship between wheel 104, drum 70 and the diameter of shaft 66 on which the cables are secured; further, the vertical positioning of the coils on tubes 72 and 74 must likewise be coordinated. It will be evident that there is considerable flexibility in these dimensions, and in the number of coils possible of use, yet the relationship of dimensions must be maintained to produce the desired linear movements.

The second-described form, with the circumferentially arranged coils positioned concentrically about shaft 66, is less demanding of exact positioning and measured relationship, where the inch indicating elements are concerned. In this instance, the electrically created fields are positioned in segments of a circle, the relationship between the sub-combination of the float-unitary measurement elements and the subdivision measuring element being one of linear movement as compared with angular movement. Therefore, by arcuately spacing the magnetic fields at a selected distance from the center of the shaft (and the greater this distance the greater the accuracy of indication on the affected meters), an accurate measurement in relation to that of the foot measuring elements can be obtained. Thus, it will be evident that this form of the device has the advantage of easy adjustment and maintenance.

Before leaving the detailed consideration of the cooperating foot and inch electrically responsive sub-combinations, two modifications of these mechanisms mentioned above will be described. The arrangement of coil pairs shown in Figure 6 and numbered as in Figure 2 to indicate functional similarity is directed to the unit, or foot, measuring assembly. In this form of the device the respective and relative magnetic strength of the coils is indicated by different diameters, and increases downwardly. Such relationship may be attained by progressively increasing the strength of the coils, by selective winding, or by adding secondary coils. All these variations are suggested in the art and are well known. In any of these forms, the four fields are arranged to be increasingly strong. In this manner, the sole magnetic slug 58 suspended by cable 62 from shaft 66, being of an operating length equal to the separate length of only one coil section, as here indicated, effects an electrical field cumulation. The meter, one only, is then progressively activated from the minimum to the maximum effect due to the increasing field strength.

The second modification of the device is a further variation in the combination of elements described as the means for indicating fractions of the unit, such as, for example, inches. In Figure 7, the six coil pairs of Figure 5 are retained, but arranged to occupy only a segment of the circular arrangement of the latter figure. Thus, the measurement of the complete sub-division of one foot will be made in a fraction of the complete revolution of movement required in Figure 5. By making the operating elements of the surface sensing means and the inch measuring means large relative to the foot responsive elements, great accuracy and a reduced number of revolutions of the mechanism can be achieved.

These two modifications of the cooperating measuring elements are illustrated and described to indicate the possibilities of the wide variations of arrangement possible in the disclosed device. Many such changes will be evident to those versed in the art. Coil position changes, alterations in shape, size and position of the magnetic influencing elements, slugs or discs; and selection of wide variations in metering arrangements are evident. In all cases, however, basic dimension relations between the surface sensing means and the coil arrangements must be maintained to gain accurate and reliable measurements.

Continuing now with Fig. 8, a schematic diagram of a preferred electrical arrangement adapted to show the feet and inches measurement of elevational changes in the level of the stored liquid is shown. It will be evident that the electrical field created and induced in the primary and secondary coils of the previously described arrangements will be transmitted electrically to responsive indicators. A plurality of independent meters of the well known milliammeter type are shown circumferentially arranged and in separate connection with each of the plurality of coil pairs described in Figs. 2 and 4. These meters are calibrated to indicate inch measurements and, as six are used, each of them has a range of two inches. Centrally positioned relative to these separate inch measuring meters are four meters sub-divided into a scale measuring feet for the approximate (or foot scale) depth of the liquid to be measured. These four meters are shifted below their central position in the meter panel 24 in Figure 8, to permit showing the wiring diagram without confusion.

As is evident to those versed in this art, the number of coils and responsive meters may be varied to suit any purpose or degree of accuracy. Although four meters are shown as the measuring means for the foot scale of this device, a rearrangement of coils such as shown in Figure 6 will permit a single meter to be used. Further, the grouping of coils either linearly or circumferentially, as indicated in Figures 3, 5, and 7, has almost limitless variation possibilities. The devices described here are selected to convey the invention in a relatively simple form.

Figure 8 is shown physically separated into three parts, indicating the possibility of wide distribution of the responsive sub-combination. This treatment follows that introduced in Figure 1, and suggests the use of the responsive sub-combination, for example, in multiple arrangement. Such a use would be to locate separate assemblies of the responsive device of this invention on a number of tanks as in a tank farm, and use one power source and one indicating or measuring means to serve the entire tank farm.

In describing the electrical circuit useful with a device of this kind, a responsive mechanism of four coils for foot measurement and six for the inch and inch-fraction function is retained as previously shown. These coils are numbered as in the previously described figures of the drawing. Primary coils 34, 36, 38 and 40 are connected in series and in parallel to the power source 20 by conductors 42 and 44, which connect to the housing 14, and by distribution connectors 100 and 102. Conductors 54, 55, 56 and 57 connect the secondary coils 46, 48, 50 and 52 to the four centrally positioned meters 141, 143, 145, and 147. Changes in the magnetic fields surrounding the coil pairs, as caused by the movement of the magnetic slugs 58 and 60 therethrough, is indicated by the meters. At the same time that meters 141, 143, 145, and 147 indicate the feet of elevation of the measured liquid level, meters 146, 148, 150, 152, 154, and 156 are responding to the movement of the means adapted to change the strength of the magnetic field, which means is arranged proximate the coils.

Primary coils 76, 78, 80, 82, 84 and 86 are connected in series and in parallel to the power source conductors 42 and 44 as by leads 101 and 103. The secondary coils 88, 90, 92, 94, 96 and 98 completing the coil pairs respectively are commonly grounded to meters 146, 148, 150, 152, 154 and 156 through conductor 99. Separate conductors 87, 89, 91, 93, 95 and 97 connect the secondary coils respectively to the metering side of the meters, each secondary coil being coupled to a separate meter, as shown. Thus, as further shown, these meters are arranged in clock form connected to read in a clockwise direction beginning and ending at the top of the dial. Each, as there are a total of six in this arrangement, will read for a space of two inches and then return to zero. Meter 146 therefore reads from zero to two inches; meter 148 from 2 to 4 inches, etc.

The description of the above-disclosed complete measuring device will make clear to those versed in the art the operation of the device. However, to emphasize the ability of this assembly to inductively measure changes of liquid elevation over great heights hitherto not considered by the patented art, and particularly to emphasize the advantages of this responsive device over known combinations used for similar purposes, a brief description summarizing the operation of the mechanism will be included.

Referring to Figs. 2 and 4, the vertical movement of the liquid surface sensing element shown here as a float 18 is transmitted to drum 70. This drum is, in comparison to the diameter of shaft 66, many times larger, as previously explained. This relationship causes the angle of movement of shaft 66 in response to the float movement to remain the same, as compared to the angle of movement of drum 70, for any float movement. However, the vertical movement of the magnetic slugs in tubes 32 and 30, the foot indicating counterweight and sub-combination, is relatively small because they are driven by the relatively small diametered shaft 66. In this case, considering a shaft having a circumference of one inch, the foot indicating elements will move only fifty inches, or approximately four feet, in measuring a depth of fifty feet in a storage tank. This depth measurement will revolve shaft 66 approximately fifty times for the complete operation.

Regarding the arrangement of coils for indicating sub-divisions of the unitary or foot measuring elements into inches, the full detailed devices require that a complete cycle of the inch measuring sub-combination be completed for every single rotation of shaft 66. This arrangement may be altered to suit the user by changing the number and position of the coils as shown in Figure 7. However, if these coils are positioned as shown in either of the suggested arrangements, the sub-division indicated by the movement of either the magnetic slugs or the rotation of the magnetic discs will be two inches measured by each coil.

The combined relationship between the surface sensing means, the foot sensing elements and the inch responsive means, as briefly described above, will now be fully understood. Any required arrangement of metering elements can be used to detect the respective positions of the magnetic elements as they alter the induced fields through which they pass. As shown in Figure 8, two separate cooperating measuring means are illustrated. In the centrally disposed meters, the feet measured by the position of the magnetic slugs in the tube supported coils are transmitted to meters 141, 143, 145 and 147 successively as the approximate measure of the height of the liquid surface. Using the foot measure as indicated on these meters, reference to the inch indications on the circumferentially distributed independent meters 146, 148, 150, 152, 154, and 156 will measure the fractions of a foot above this approximate measure as inches and fractions thereof. Only those meters of the inch measuring group which are actually measuring the field variations will be affected. All others will read zero. Therefore the most advanced meter in the clockwise arranged grouping will indicate the true measure, that adjacent in a counterclockwise direction showing the reading of the affected field in the coil most recently having been passed through. It is of course true that voltages will be induced in the various secondaries 88, 90, etc. even when no slug is positioned therein; however, such voltages are negligible compared to the voltage induced when a slug is positioned therein.

By means of the arrangement of elements as above described and the utilization of two correlated sets of induction coils respectively responsive to feet and inch measurements, it is possible to compress a mechanism for detecting wide variations in liquid depths into a relatively small, compact sensing device. The advantages of exact measurement, free of electrical arcing with the resultant safety in use with volatile liquids, are demonstrated. The invention described here is possible of being carried out in other specific ways, as indicated, and the present embodiments are to be considered as illustrative and not restrictive. Further, the multiple use of the sensing transmitting mechanism on a great number of tanks as, for example, in what is known as a "tank farm" in the petroleum industry, is contemplated as an inventive extension of this mechanism not amounting to further invention. A plurality of the responsive devices can be mounted on a number of tanks and the separate sensing of the liquid level in the attended tanks is readily transmitted to a single set of meters located remotely from the area. Then by means of proper switching devices any tank of a plurality of tanks so attended may be measured, separately, at any time.

There is not claimed herein the specific construction of the subdivision measuring device which is illustrated in Figures 2 and 3, to wit, tubes mounting induction coils through which are passed a plurality of magnetic members or slugs arranged on an endless cable. This subject matter is claimed in the divisional application, Serial No. 719,084, filed March 4, 1958.

The invention claimed is:

1. A liquid level indicator comprising a movable liquid level sensing means, a plurality of primary electrical coils, a corresponding plurality of secondary electrical coils spaced from said primary coils but each adapted to be inductively coupled to a respective one of said primary coils, a source of electrical current connected to the primary coils, said source being adapted to induce an electrical response in the secondary coils, electrically responsive meters individually connected to said secondary coils, and movable electromagnetic shielding means positioned between said primary coils and said secondary coils and operably responsive to the movement of said liquid level sensing means, said shielding means normally acting to shield said secondary coils from said primary coils but moving in response to movement of said liquid level sensing means to successively and sequentially expose each of said secondary coils to the effect of the electrical field in its own respective primary coil, thereby indicating changes in liquid level on the individual meter coupled to the exposed and responding secondary coil.

2. A liquid level indicator comprising a movable liquid level sensing means, a first group of inductively-coupled coils arranged vertically to electrically measure approximate liquid level changes of selected unit value, means responsive to movement of said liquid level sensing means for varying the coupling between said coils to thereby afford this approximate measurement; a second group of coils cooperating with said first group to subdivide the selected unit of approximate measurement into proportionate sub-units of measurement, said second group of coils comprising a plurality of primary electrical coils and a corresponding plurality of secondary electrical coils spaced from said primary coils but each adapted to be inductively coupled to a respective one of said primary coils; a source of electrical current connected to the primary coils, said source being adapted to induce an electrical response in the secondary coils, electrically responsive meters individually connected to said secondary coils, and movable electromagnetic shielding means positioned between said primary coils and said secondary coils and operably responsive to the movement of said liquid level sensing means, said shielding means normally acting to shield said secondary coils from said primary coils but moving in response to movement of said liquid level sensing means to successively and sequentially expose each of said secondary coils to the effect of the electrical field in its own respective primary coil, thereby indicating changes in liquid level on the individual meter coupled to the exposed and responding secondary coil.

3. A liquid level measuring means comprising in combination with a float adapted to movably respond to changes in the liquid level, a rotatable shaft positioned to cooperate with said float, means coupling said shaft to said float to rotate said shaft proportionately to the movement of said float, electrically responsive means coupled to said shaft for indicating unitary movements of the float, and means for indicating fractional divisions of the unitary movements of the float, said last-mentioned means including a plurality of primary coils all positioned concentrically about said shaft and connected to a source of electrical current, a plurality of secondary coils positioned opposite to and spaced from said primary coils but each adapted to be inductively coupled to a respective one of said primary coils, and a magnetic disk attached to and rotatable with the shaft between the primary and secondary coils, the disk being apertured to controllably regulate the degree of inductive coupling between the primary and secondary coils.

4. The liquid level measuring means of claim 3 characterized in that the electrically responsive means coupled to said shaft for indicating unitary movements of the float includes concentrically wound primary and secondary coils forming a cylinder, the primary coil being connected to the electrical current source, a magnetic member vertically movable inside the coil-wound cylinder, and means coupling said magnetic member to said shaft, to thereby move said member vertically proportionately to the movement of said float.

References Cited in the file of this patent

UNITED STATES PATENTS

| 2,026,299 | Boyd | Dec. 31, 1935 |
| 2,216,069 | Doyle | Sept. 24, 1940 |
| 2,424,766 | Miner | July 29, 1947 |
| 2,536,465 | Reeves | Jan. 2, 1951 |
| 2,775,755 | Sink | Dec. 25, 1956 |

FOREIGN PATENTS

| 388,999 | Great Britain | Mar. 9, 1933 |
| 370,498 | Italy | Apr. 18, 1939 |
| 715,046 | Germany | Dec. 12, 1941 |